United States Patent
Kim et al.

(10) Patent No.: US 6,849,567 B2
(45) Date of Patent: Feb. 1, 2005

(54) LOW TEMPERATURE SINTERABLE DIELECTRIC CERAMIC COMPOSITION AND MULTILAYER CERAMIC CHIP CAPACITOR USING THE SAME

(75) Inventors: Joon Hee Kim, Kyungki-do (KR); Kang Heon Hur, Kyungki-do (KR); Hae Sung Park, Kyungki-do (KR); Jong Han Kim, Kyungki-do (KR); Woo Sup Kim, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 40 days.

(21) Appl. No.: 10/464,781

(22) Filed: Jun. 19, 2003

(65) Prior Publication Data

US 2004/0106510 A1 Jun. 3, 2004

(30) Foreign Application Priority Data

Dec. 3, 2002 (KR) ................................. 10-2002-0076129

(51) Int. Cl.$^7$ ............................................. C04B 35/468
(52) U.S. Cl. ..................................... 501/139; 361/321.4
(58) Field of Search ....................... 501/139; 361/321.4, 361/321.5

(56) References Cited

U.S. PATENT DOCUMENTS

| | | | |
|---|---|---|---|
| 5,403,797 A | * | 4/1995 | Ohtani et al. ................ 501/138 |
| 6,243,254 B1 | | 6/2001 | Wada et al. ................. 361/311 |
| 6,777,363 B2 | * | 8/2004 | Park et al. ................... 501/139 |

OTHER PUBLICATIONS

Abstract—Japanese Patent No. JP2000311828, Published Nov. 7, 2000.

* cited by examiner

Primary Examiner—Karl Group
(74) Attorney, Agent, or Firm—Lowe Hauptman Gilman & Berner, LLP

(57) ABSTRACT

A low temperature sinterable dielectric ceramic composition and a multilayer ceramic chip capacitor. The dielectric ceramic composition is expressed by the general formula: $aBaTiO_3\text{-}bMgCO_3\text{-}cY_2O_3\text{-}dCr_2O_3\text{-}eV_2O_5\text{-}f(xZrO_2\text{-}y(K,Li)_2O\text{-}zSiO_2)$ ($x+y+z=1$; $0.05 \leq x \leq 0.18$, $0.01 \leq y \leq 0.08$, and $0.74 \leq z \leq 0.93$); in which a, b, c, d, e and f are molar ratios; $a=100$, $1.0 \leq b \leq 2.0$, $0.2 \leq c \leq 2.0$, $0.02 \leq d \leq 0.3$, $0.02 \leq e \leq 0.3$, and $0.5 \leq f < 2$. The multilayer ceramic chip capacitor is prepared using the dielectric ceramic composition. The dielectric composition according to the present invention can be sintered at a low temperature without decrease of a dielectric constant, making it possible to make ultra thin-layered dielectrics.

6 Claims, No Drawings

LOW TEMPERATURE SINTERABLE DIELECTRIC CERAMIC COMPOSITION AND MULTILAYER CERAMIC CHIP CAPACITOR USING THE SAME

BACKGROUND OF THE INVENTION

1. Field of the Invention

The present invention relates to a dielectric ceramic composition, and more particularly to a dielectric ceramic composition, which can be sintered at a low temperature without decrease of a dielectric constant, making it possible to make ultra thin-layered dielectrics, and a multilayer ceramic chip capacitor using the same.

2. Description of the Related Art

With the recent advance of the electronic devices industry, there is an increasing requirement to develop smaller-sized electronic parts with larger capacitance. Multilayer ceramic chip capacitors form a multi-layered structure by alternating electrode layers and high dielectric constant-based ceramic layers. They are widely used as electronic parts featuring a small size and large capacitance.

Relatively inexpensive base metals such as Ni and Ni alloys have been used as internal electrodes in place of expensive noble metals such as Ag and Pd in multilayer ceramic chip capacitors. The internal electrodes made of Ni may be oxidized upon being sintered in air. Therefore, co-sintering of dielectric layers and internal electrodes must be effected in a reducing atmosphere. However, sintering in a reducing atmosphere causes the dielectric layers to be reduced, resulting in a lower resistivity. Non-reducible dielectric ceramic materials were thus proposed.

An exemplary non-reducible dielectric ceramic composition for dielectric ceramic chip capacitors using Ni for inner electrodes is disclosed in Japanese Patent Application Laid-Open Publication No. 2000-311828. The dielectric ceramic composition comprises $BaTiO_3$: 100 mol, at least one selected from MgO, CaO, BaO, SrO and $Cr_2O_3$: 0.1 to 3 mol, $(Ba, Ca)_xSiO_{2+x}$ (provided that x=0.8 to 1.2): 2 to 12 mol, at least one selected from $V_2O_5$, $MoO_3$ and $WO_3$: 0.1 to 3 mol, and an oxide of R (R is at least one selected from Y, Dy, Tb, Gd and Ho): 0.1 to 10 mol. This composition satisfies X7R characteristics (EIA standard), and change of capacitance with time under a direct current electric field and decrease of capacitance are small. Despite these advantages, a sintering temperature is too high, 1,270° C.

If a sintering temperature is high, a Ni internal electrode layer shrinks at a lower temperature than a dielectric ceramic layer, thereby causing interfacial delamination of the two layers. Furthermore, due to lumping between internal electrode layers, short circuit between internal electrodes is liable to occur. In particular, when the thickness of each dielectric layer is reduced to 5 μm or less in order to provide multilayer ceramic chip capacitors of large capacitance and small size, short circuit between internal electrodes may more frequently occur at a high sintering temperature. For this reason, the dielectric ceramic composition for ultra thin-layered ceramic chip capacitors having Ni internal electrodes must be sintered at a low temperature of 1,200° C. or less. In addition to the above, much higher voltage is applied on dielectric materials when dielectric ceramic layers are thinned, often causing troubles such as decrease of a dielectric constant and a poor temperature characteristic of capacitance (hereinafter, also referred to as "TCC"). Furthermore, the rate of change of capacitance depending on DC bias is increased. Especially, when the thickness of each dielectric layer is reduced to 3 μm or less, a smaller number of ceramic particles are contained between inner electrodes, making it difficult to assure stable dielectric properties.

An exemplary low temperature sinterable, thin and multi-layered ceramic chip capacitor is disclosed in U.S. Pat. No. 6,243,254. The dielectric ceramic composition for this capacitor contains a major component expressed by the general formula: $(Ba_{1-x}Ca_xO)_mTiO_2 + \alpha\ Re_2O_3 + \beta\ MgO + \gamma MnO)$ (Re is at least one selected from the group consisting of Y, Gd, Tb, Dy, Ho, Er and Yb), and 0.2 to 5.0 parts by weight of either a first minor component $Li_2O$—$(Si,Ti)O_2$—Mn (MO is at least one selected from $Al_2O_3$ and $ZrO_2$) or a second minor component $SiO_2$—$TiO_2$—XO-based oxide (XO is at least one selected from BaO, CaO, SrO, MgO, ZnO and MnO), per 100 parts by weight of the major component. The dielectric composition can be sintered at a low temperature of 1,250° C. or less and a temperature characteristic of capacitance satisfies X7R characteristics stipulated under the EIA standard. However, when the thickness of each dielectric layer is reduced to 3 μm or less, a dielectric constant is greatly decreased to the level of 1,130 to 2,900. In this regard, it is difficult to prepare capacitors with large capacitance.

SUMMARY OF THE INVENTION

Therefore, the present invention has been made in view of the above problems, and it is an object of the present invention to provide a dielectric ceramic composition, which can be sintered at a low temperature without decrease of a dielectric constant, making it possible to make ultra thin-layered dielectrics, and which satisfies X5R characteristics (EIA standard). Another object of the invention is to provide a multilayer ceramic chip capacitor using the composition.

In accordance with one aspect of the present invention, the above and other objects can be accomplished by the provision of a dielectric ceramic composition expressed by the general formula: $aBaTiO_3$-$bMgCO_3$-$cY_2O_3$-$dCr_2O_3$-$eV_2O_5$-$f(xZrO_2$-$y(K,Li)_2O$-$zSiO_2)$ ($x+y+z=1$; $0.05 \leq x \leq 0.18$, $0.01 \leq y \leq 0.08$, and $0.74 \leq z \leq 0.93$); in which a, b, c, d, e and f are molar ratios; a=100, $1.0 \leq b \leq 2.0$, $0.2 \leq c \leq 2.0$, $0.02 \leq d \leq 0.3$, $0.02 \leq e \leq 0.3$ and $0.5 \leq f < 2$.

In accordance with another aspect of the present invention, there is provided a multilayer ceramic chip capacitor prepared by alternately stacking dielectric layers comprising the above dielectric ceramic composition and internal electrodes.

Preferably, in the multilayer ceramic chip capacitor, the inner electrodes are selected from base metals such as Ni and Ni alloys.

Preferably, in the multilayer ceramic chip capacitor, the dielectric layers are 5 μm or less, and preferably 2 to 5 μm, in thickness.

DESCRIPTION OF THE PREFERRED EMBODIMENTS

Hereinafter, the present invention will be described in more detail.

The present inventors found that a dielectric ceramic composition $aBaTiO_3$-$bMgCO_3$-$cY_2O_3$-$dCr_2O_3$-$eV_2O_5$ can be sintered at a low temperature and has a high dielectric constant in the presence of a glass composition $xZrO_2$-$y(K, Li)_2O$-$zSiO_2$. The present invention has been accomplished based on this finding. The dielectric ceramic composition of the present invention can be used to provide a multilayer ceramic chip capacitor with large capacitance because it can provide a high dielectric constant of 3,000 or more even when a dielectric layer is made to be ultra-thin with a thickness of 3 μm or less and sintering is carried out at a low temperature, satisfies X5R characteristics, and has an excellent insulation resistance and a small change of capacitance depending on DC bias.

Described below are the dielectric ceramic compositions of the present invention. Unless specified otherwise, the contents of all dielectric components are based on 100 mol of $BaTiO_3$.

[$MgCO_3$]

$MgCO_3$ serves to form a core-shell structure by controlling growth of $BaTiO_3$ particles. That is, $MgCO_3$ controls diffusion of additive components toward the center portion of $BaTiO_3$, resulting in only $BaTiO_3$ as a core being left at the center portion of core-shell structure. To this end, it is preferable to limit the content of $MgCO_3$ to a range of 1.0 to 2.0 mol. If the content of $MgCO_3$ is less than 1.0 mol, due to excessive growth of $BaTiO_3$ particles, a dielectric constant is increased but a dielectric loss factor is increased and a temperature characteristic of capacitance becomes poor. On the contrary, if it exceeds 2.0 mol, sintering property becomes poor and an accelerated lifetime is shortened.

[$Y_2O_3$]

$Y_2O_3$ is effective for lengthening an accelerated lifetime and providing a stable temperature characteristic of capacitance. Therefore, $Y_2O_3$ is preferably added in an amount of 0.2 to 2.0 mol. If the content of $Y_2O_3$ is less than 0.2 mol, an accelerated lifetime is shortened. While, if it exceeds 2.0 mol, sintering property becomes poor and a dielectric constant is lowered.

[$Cr_2O_3$]

$Cr_2O_3$ is effective for improving non-reducibility. If the content of $Cr_2O_3$ is less than 0.02 mol, dielectric ceramic compositions are converted into semiconductors, while if it exceeds 0.3 mol, an insulation resistance is lowered.

[$V_2O_5$]

$V_2O_5$ is effective for improving reliability. If the content of $V_2O_5$ is less than 0.02 mol, an accelerated lifetime is shortened, while if it exceeds 0.3 mol, a dielectric constant and an insulation resistance are lowered.

[$xZrO_2$-$y(K,Li)_2O$-$zSiO_2$($x+y+z=1$; $0.05 \leq x \leq 0.18$, $0.01 \leq y \leq 0.08$, and $0.74 \leq z \leq 0.93$)]

The glass composition, $ZrO_2$-$(K,Li)_2O$—$SiO_2$ is added as a low temperature sintering aid and thus acts to lower a sintering temperature to 1,200° C. or less. If the content of the glass composition is less than 0.5 mol, sintering property becomes poor and a temperature characteristic of capacitance falls outside standard range. On the contrary, if it is 2.0 mol or more, a dielectric constant is decreased and excessive growth of particles occurs, resulting in significant decrease of capacitance under a direct current electric field.

In the glass composition, $xZrO_2$-$y(K,Li)_2O$-$zSiO_2$, $ZrO_2$ is added to increase a dielectric constant and secure a stable change of capacitance at a high temperature. If the content of ZrO2 (x value) is less than 0.05, a stable temperature characteristic of capacitance at a high temperature is not secured. If it exceeds 0.18, there is little effect of improving dielectric properties. Meanwhile, $Li_2O$ or $K_2O$ is added to lower the softening temperature of the glass composition, giving rise to a low temperature sintering. If the content of $Li_2O$ or $K_2O$ (y value) is less than 0.01, sintering property becomes poor. On the contrary, if it exceeds 0.08, a softening temperature is too low and thus the glass composition is lumpy at a low temperature. As a result, the glass composition is not uniformly distributed in the form of liquid phase at a sintering temperature. Therefore, abnormal growth of particles occurs upon sintering. $SiO_2$ is a main component in the glass composition and its content is determined based on the contents of other glass components.

It is most preferable to limit the particle size of the glass composition to 0.5 μm or less. If the particle size of the glass composition exceeds 0.5 μm, due to segregation of some melt glass composition during sintering, abnormal growth of particles occurs. As a result, dielectric properties become poor and the glass composition can be segregated on the surface of a sintered body.

It is preferable to limit the mean particle size of $BaTiO_3$ to 0.4 μm or less. In dielectric compositions with X5R characteristics, the particle size of a sintered body is almost the same as that of $BaTiO_3$ as a starting material. Therefore, as the particle size of $BaTiO_3$ becomes small, a dielectric constant is lowered. In this regard, it is preferable to increase the particle size of $BaTiO_3$. However, in order to make ultra thin-layered dielectrics (about 3 μm or less in thickness), it is necessary to limit the particle size of $BaTiO_3$ to 0.4 μm or less. As the dielectric layer becomes thinner, electric field strength per unit thickness is increased. Therefore, if the particle size of $BaTiO_3$ exceeds 0.4 μm, the rate of change of capacitance depending on DC bias is excessively increased.

Next, the multilayer ceramic chip capacitor of the present invention will be described.

The multilayer ceramic chip capacitor of the present invention is prepared by alternately stacking dielectric layers having the dielectric ceramic composition as described above, and internal electrodes. It is preferable to limit the thickness of each dielectric layer to 5 μm or less, more preferably 2 to 5 μm, for preparation of capacitors with large capacitance. Base metals such as Ni and Ni alloys are preferable as the internal electrode materials. External electrodes are composed of sintered layers of a conductive metal powder such as Ag, Pd, Ag—Pd, Cu and Cu alloys or alternately, sintered layers of the conductive metal powder supplemented with a glass frit. Plating layers can be formed thereon. The plating layers are comprised of Ni, Cu or Ni—Cu alloys or a plating layer containing tin or solder can be formed thereon.

According to one method for preparing the multilayer ceramic chip capacitor of the present invention, first, starting materials for dielectric ceramic composition are prepared in the form of powders by a solid phase method or a wet synthesis method such as a hydrothermal synthesis method and an alkoxide method. The prepared materials are mixed in a prescribed composition ratio. The mixed powders are turned into slurry by addition of an organic binder. The slurry is molded into a sheet. Inner electrodes are then formed on one face of the sheet. Any method including screen printing, vacuum deposition or plating may be used for forming the inner electrodes. Then, a required number of the sheets having the inner electrodes are laminated, to form a laminated body after pressing. A pair of outer electrodes are formed on both side ends of the laminated body so as to be electrically connected to the inner electrodes. Finally, plating layers are formed, if necessary, on the outer electrodes, thereby completing the multilayer ceramic chip capacitor. The sintering of the dielectric composition according to the present invention is accomplished at 1,200° C. or less, and preferably at 1,150 to 1,200° C.

Hereinafter, the present invention will be described in more detail by way of the non-limiting examples.

EXAMPLES

Each component of a sintering aid, $ZrO_2$—$(K,Li)_2O$—$SiO_2$ was weighed, mixed, dissolved at a temperature ranging from 1,300 to 1,400° C., quenched quickly at water and dry milled, followed by milling using ethyl alcohol to thereby obtain a glass composition powder mixture with a particle size of 0.5 μm or less.

Next, before mixing of $BaTiO_3$ and additive components, the additive components were separately mixed. In detail, the above glass composition powder mixture, and $MgCO_3$, $Y_2O_3$, $Cr_2O_3$ and $V_2O_5$ powders were weighed, wet mixed for 24 hours and dried at 100° C. for 3 hours or more. The mean particle size of the mixed additive components was 0.3 to 0.4 μm. It is preferable that the maximum particle size of the mixed additive components be 3 μm.

Next, $BaTiO_3$ and the previously mixed additive components were mixed and dispersed. In detail, $BaTiO_3$ with 0.4 μm particle size and the previously mixed additive components were mixed and dispersed in the presence of a solvent and a dispersant for 3 to 4 hours.

A binder was also added to thereby make slurry, which was formed into a sheet. The forming into a sheet was carried out after the slurry was filtered and stabilized. The slurry was transformed into a sheet with a thickness of 2.8 μm by a die coater. An internal electrode pattern of 2012 (2.0 mm×1.2 mm) size was printed on the transformed sheet and then 20 layers of the pattern printed sheets were laminated one onto another. The resultant laminate was cut by CIP (Cold Isostatic Press) at 85° C. for 15 minutes under pressure of 1,000 kg/cm² to thereby form chips, which were used as samples for evaluation for dielectric properties.

Each chip sample was heat-treated in air at 250 to 300° C. to remove the binder. Then, sintering was carried out in a tube furnace under an appropriate sintering temperature and atmosphere. A partial pressure of oxygen for sintering was set to be $10^{-11}$ atm and the sintering was continued at 1,180° C. for 2 hours. In—Ga was used as an external electrode.

The chip samples prepared as the above were evaluated for electric properties. Capacitance and dielectric loss were measured at 1 KHz, 1 Vrms using a capacitance meter (Agilent, 4284A). Dielectric constant was calculated using the formula; $C=\epsilon_0 \cdot \epsilon_r \times S/d \times n$ (C: capacitance, $\epsilon_0$: dielectric constant in vacuum, $\epsilon_r$: dielectric constant, S: electrode overlapping area, d: thickness of dielectric layer, n: number of dielectric layers). DC bias characteristic was evaluated by calculating the rate of change of capacitance at 1 KHz, 1 Vrms under DC bias of 6.3V using the 4284A. Resistivity was obtained from the formula: $R \times C = \rho \cdot \epsilon_0 \cdot \epsilon_r$ (R: insulation resistance, C: capacitance, ρ: resistivity, $\epsilon_0$: dielectric constant in vacuum, $\epsilon_r$: dielectric constant) using insulation resistance measured with a high resistance meter (Agilent, 4339B). Temperature characteristic of capacitance (TCC) was evaluated over the temperature range between −55° C. and 85° C. (X5R characteristics) using a 4220A test chamber. Sintering property was evaluated by observing surface fractures of a chip under SEM (Scanning Electron Microscope).

TABLE 1

| | Dielectric composition (based on 100 mol of $BaTiO_3$) | | | | | | | | Sintering |
|---|---|---|---|---|---|---|---|---|---|
| | $bMgCO_3$ | $cY_2O_3$ | $dCr_2O_3$ | $eV_2O_5$ | $f(xZrO_2-y(Li, K)_2O-zSiO_2)$ | | | | |
| Sample | $1.0 \leq b \leq 2.0$ | $0.2 \leq c \leq 2.0$ | $0.02 \leq d \leq 0.3$ | $0.02 \leq e \leq 0.3$ | $0.5 \leq f < 2.0$ | $0.05 \leq x \leq 0.18$ | $0.01 \leq y \leq 0.08$ | $0.74 \leq z \leq 0.93$ | temperature (° C.) |
| Inv. 1 | 1.3 | 0.6 | 0.2 | 0.1 | 0.7 | 0.07 | 0.02 ($Li_2O$) | 0.91 | 1180 |
| Comp. 2 | 1.3 | 0.6 | 0.2 | 0.1 | 0.7 | 0.03 | 0.02 ($Li_2O$) | 0.95 | 1180 |
| Inv. 3 | 1.3 | 0.6 | 0.2 | 0.1 | 0.7 | 0.1 | 0.04 ($Li_2O$) | 0.86 | 1180 |
| Comp. 4 | 1.3 | 0.6 | 0.2 | 0.1 | 0.7 | 0.1 | 0.15 ($K_2O$) | 0.75 | 1180 |
| Comp. 5 | 1.4 | 0.6 | 0.2 | 0.1 | 0.4 | 0.07 | 0.02 ($Li_2O$) | 0.91 | 1180 |
| Comp. 6 | 1.4 | 0.6 | 0.2 | 0.1 | 0.4 | 0.1 | 0.04 ($Li_2O$) | 0.86 | 1180 |
| Comp. 7 | 1.4 | 0.2 | 0.1 | 0.1 | 2.0 | 0.07 | 0.02 ($Li_2O$) | 0.91 | 1180 |
| Comp. 8 | 1.5 | 0.3 | 0.1 | 0.1 | 2.0 | 0.1 | 0.04 ($K_2O$) | 0.86 | 1180 |
| Inv. 9 | 1.5 | 0.9 | 0.08 | 0.03 | 0.7 | 0.07 | 0.02 ($Li_2O$) | 0.91 | 1180 |
| Inv. 10 | 1.6 | 0.9 | 0.1 | 0.1 | 0.9 | 0.1 | 0.04 ($Li_2O$) | 0.86 | 1180 |
| Inv. 11 | 1.6 | 0.9 | 0.08 | 0.03 | 0.9 | 0.1 | 0.04 ($Li_2O$) | 0.86 | 1180 |
| Comp. 12 | 1.3 | 2.5 | 0.1 | 0.1 | 0.7 | 0.07 | 0.02 ($Li_2O$) | 0.91 | 1180 |
| Comp. 13 | 1.3 | 2.5 | 0.1 | 0.1 | 0.9 | 0.07 | 0.02 ($Li_2O$) | 0.91 | 1180 |
| Comp. 14 | 1.4 | 0.3 | 0 | 0.1 | 0.7 | 0.1 | 0.04 ($Li_2O$) | 0.86 | 1180 |
| Comp. 15 | 1.4 | 0.3 | 0.1 | 0.4 | 0.7 | 0.1 | 0.04 ($Li_2O$) | 0.86 | 1180 |
| Inv. 16 | 1.4 | 1.5 | 0.2 | 0.1 | 0.7 | 0.1 | 0.04 ($K_2O$) | 0.86 | 1180 |

Inv.: inventive sample
Comp.: comparative sample

TABLE 2

| Sample | Dielectric constant | Dielectric loss (%) | TCC (%) | | | | Resistivity × $10^{11}$ (Ω cm) | Rate of decrease of capacitance (%) | Sintering property | Remark |
|---|---|---|---|---|---|---|---|---|---|---|
| | | | −55° C. | 0° C. | 45° C. | 85° C. | | | | |
| Inv. 1 | 3700 | 4.0 | −5.0 | 0.0 | 0.2 | −8.0 | 20 | −40 | Good | Good |
| Comp. 2 | 3450 | 3.4 | 2.0 | 2.0 | −5.0 | −17.0 | 22 | −42 | Good | D |
| Inv. 3 | 3720 | 3.8 | −6.0 | −1.0 | 1.2 | −10.0 | 23 | −39 | Good | Good |
| Comp. 4 | 4200 | 7.0 | −16.0 | −4.1 | 1.2 | −16.5 | 18 | −64 | A | D, E |
| Comp. 5 | 3000 | 3.0 | −4.0 | 0.2 | 1.2 | −7.0 | 1.2 | −40 | B | F |
| Comp. 6 | 2800 | 2.9 | −4.2 | 0.3 | 1.5 | −6.8 | 2.1 | −42 | B | F |

TABLE 2-continued

| Sample | Dielectric constant | Dielectric loss (%) | TCC (%) −55° C. | 0° C. | 45° C. | 85° C. | Resistivity × $10^{11}$ ($\Omega\,\square\,cm$) | Rate of decrease of capacitance (%) | Sintering property | Remark |
|---|---|---|---|---|---|---|---|---|---|---|
| Comp. 7 | 4200 | 5.6 | −15.5 | −6.0 | 1.3 | −15.2 | 25 | −65 | A | D, E, G |
| Comp. 8 | 4300 | 6.3 | −16.0 | −5.2 | 2.0 | −16.2 | 28 | −67 | A | D, E, G |
| Inv. 9 | 3450 | 3.5 | −7.0 | −1.7 | 1.2 | −12.0 | 30 | −37 | Good | Good |
| Inv. 10 | 3500 | 3.7 | −6.5 | −1.0 | 1.0 | −10.0 | 20 | −38 | Good | Good |
| Inv. 11 | 3600 | 3.8 | −8.0 | 0.2 | −0.2 | −11.0 | 40 | −40 | Good | Good |
| Comp. 12 | 3000 | 2.7 | −5.0 | −1.8 | 0.1 | −5.0 | 1.2 | −35 | B | F |
| Comp. 13 | 3100 | 2.8 | −6.0 | −2.0 | −0.1 | −6.0 | 1.5 | −37 | B | F |
| Comp. 14 | Conversion into semiconductor | | | | | | | | | |
| Comp. 15 | 3000 | 2.7 | −7.0 | −2.0 | −0.2 | −7.0 | 0.1 | −38 | C | H |
| Inv. 16 | 3200 | 3.0 | −4.0 | 0.0 | 1.0 | −3.0 | 20 | −35 | Good | Good |

Inv.: inventive sample, Comp.: comparative sample, A: particle growth, B: not sintered, C: decrease of resistivity, D: poor TCC, E: poor DC bias characteristic, F: poor sintering property, G: dielectric loss, H: poor insulation resistance As shown in Table 1 and Table 2, the chip of comparative sample 2, in which the content of ($xZrO_2$-$y(Li, K)_2O$-$zSiO_2$) was 0.7 mol, exhibited good sintering property. However, the content of $ZrO_2$ which acts to secure a stable TCC at a high temperature was too small, resulting in large capacitance change at a high temperature (85° C.).

The chip of comparative sample 4 exhibited an abnormal growth of particles. This is because excessive $K_2O$ lowers the softening temperature of the glass composition, resulting in lumping of the glass composition at a low temperature. As a result, the glass composition cannot be uniformly distributed in the form of liquid phase at a sintering temperature, so that abnormal growth of particles may occur upon being sintered. Such abnormal growth of particles leads to a high dielectric constant but a dielectric loss increases, and a DC bias characteristic and a temperature characteristic of capacitance become poor.

In case of the chips of comparative samples 5 and 6, the content of the glass composition was too small and thus sintering did not occur. Also, a dielectric constant and an insulation resistance were decreased.

In case of the chips of comparative samples 7 and 8, excess glass composition was added and thus excessive growth of particles occurred. As a result, a dielectric constant was increased but a dielectric loss was increased and a TCC and a DC bias characteristic become poor.

The chips of comparative samples 12 and 13 had satisfactory glass composition but exhibited poor sintering property due to excess $Y_2O_3$.

The composition of comparative sample 14, in which $Cr_2O_3$ was not added, was converted into a semiconductor due to poor non-reducibility.

The chip of comparative sample 15, in which excess $V_2O_5$ was added, exhibited a low dielectric constant and a poor insulation resistance. Therefore, this chip sample lacks industrial applicability.

However, the chips of inventive samples 1, 3, 9, 10, 11 and 16 exhibited good dielectric properties.

As apparent from the above description, the dielectric ceramic composition of the present invention can be co-sintered with internal electrodes at a low temperature of 1,200° C. or less in the form of ultra-thin layers. As a result, short circuit between internal electrodes does not occur. Furthermore, base metals such as Ni or Ni alloys can be used as internal electrodes. In particular, because ultra thin dielectric layers according to the present invention can provide a high dielectric constant, the dielectric ceramic composition of the present invention can be used in preparing a multilayer ceramic chip capacitor with high reliability and large capacitance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A low temperature sinterable dielectric ceramic composition expressed by the general formula:

$a$BaTiO$_3$-$b$MgCO$_3$-$c$Y$_2$O$_3$-$d$Cr$_2$O$_3$-$e$V$_2$O$_5$-$f(x$ZrO$_2$-$y$(K,Li)$_2$O-$z$SiO$_2$) ($x+y+z=1$; $0.05 \leq x \leq 0.18$, $0.01 \leq y \leq 0.08$, and $0.74 \leq z \leq 0.93$);

in which a, b, c, d, e, and f are molar ratios; a=100, $1.0 \leq b \leq 2.0$, $0.2 \leq c \leq 2.0$, $0.02 \leq d \leq 0.3$, $0.02 \leq e \leq 0.3$, and $0.5 \leq f < 2$.

2. The composition as set forth in claim 1, wherein the BaTiO$_3$ has a mean particle size of 0.4 μm or less.

3. The composition as set forth in claim 1, wherein the $x$ZrO$_2$-$y$(K,Li)$_2$O-$z$SiO$_2$ has a mean particle size of 0.5 μm or less.

4. A multilayer ceramic chip capacitor prepared by alternately stacking dielectric layers having the dielectric ceramic composition as set forth in claims 1 and internal electrodes.

5. The multilayer ceramic chip capacitor as set forth in claim 4, wherein the inner electrodes are selected from Ni and Ni alloys.

6. The multilayer ceramic chip capacitor as set forth in claim 4, wherein the electric layers are 2 to 5 μm in thickness.

* * * * *